US006166910A

United States Patent [19]

Ronberg et al.

[11] Patent Number: 6,166,910

[45] Date of Patent: Dec. 26, 2000

[54] COMPUTER SECURITY DEVICE

[75] Inventors: M. Edwin Ronberg; Robert E. Mercer, both of Gloucester; Case J. Vandenbelt, Ottawa, all of Canada

[73] Assignee: Computer Security Devices, Inc., Ontario, Canada

[21] Appl. No.: 09/272,367

[22] Filed: Mar. 19, 1999

[30] Foreign Application Priority Data

Mar. 19, 1998 [CA] Canada .................................. 2232729

[51] Int. Cl.[7] ..................................................... F16M 13/00

[52] U.S. Cl. ....................... 361/724; 361/683; 312/223.1; 248/551

[58] Field of Search ............................ 361/683; 248/551, 248/552, 553; 312/223.1

[56] References Cited

U.S. PATENT DOCUMENTS

| | | | |
|---|---|---|---|
| 4,353,521 | 10/1982 | Webb | 248/552 |
| 4,585,202 | 4/1986 | Parsekian | 248/553 |
| 4,884,420 | 12/1989 | Finkel et al. | 70/58 |
| 5,052,199 | 10/1991 | Derman | 70/58 |
| 5,135,197 | 8/1992 | Kelley et al. | 248/551 |
| 5,154,456 | 10/1992 | Moore et al. | 292/162 |
| 5,228,658 | 7/1993 | Kelley | 248/551 |
| 5,443,312 | 8/1995 | Schluter | 312/223.1 |
| 5,660,451 | 8/1997 | Glynn | 312/223.2 |

*Primary Examiner*—Leo P. Picard
*Assistant Examiner*—Hung Van Duong
*Attorney, Agent, or Firm*—Jones, Tullar & Cooper PC

[57] ABSTRACT

The invention relates to security apparatus for computer equipment and, more particularly, to a device for securing a computer casing and its contents, i.e. the CPU and/or docking station, to a surface to prevent its theft and/or to prevent tampering with or pilfering of its internal components. In one embodiment, the device comprises an open-ended base (12) which is mountable on a surface by fasteners such that the unfastening elements therefor are contained generally within the base. A containment structure (14) comprising a frame (18) and a plurality of connecting members (20*a*, 20*b*, 20*c*, 20*d*) is fastenable to the base by fasteners whose unfastening elements therefor are likewise contained within the base. The containment structure prevents the CPU (16) from being removed from the base in at least two directions, namely a direction substantially perpendicular to the base on account of the frame and in lateral directions due to the location of the connecting member pairs (20*a*, 20*c* and 20*b*, 20*d*) at the sides of the CPU. When the CPU is positioned within the containment structure, access to the unfastening elements is restricted by a pair of cover plates (102, 104) which cover the open ends (22, 24) of the base and which are lockable together in this position. Each cover plate includes a tab (112, 114) which abuts the respective front or rear face of the CPU to prevent its removal from the containment structure in the longitudinal direction, i.e. between the front or rear pairs of connecting members (20*a*, 20*b* or 20*c*, 20*d*). The distance between the tabs may be varied to accommodate CPU's of varying depths. The frame may also be adjustable to accommodate CPU's of different depths and is adapted to be arranged in several different configurations, one of which compensates for variations in the width of the CPU while another provides a back-up deterrent against easy removal of the CPU in the longitudinal direction in the event the cover plate lock mechanism is defeated. In a second embodiment, one of the cover plates is fixed on the base while the other is pivotable and lockable against the base.

41 Claims, 11 Drawing Sheets

Fig. 21
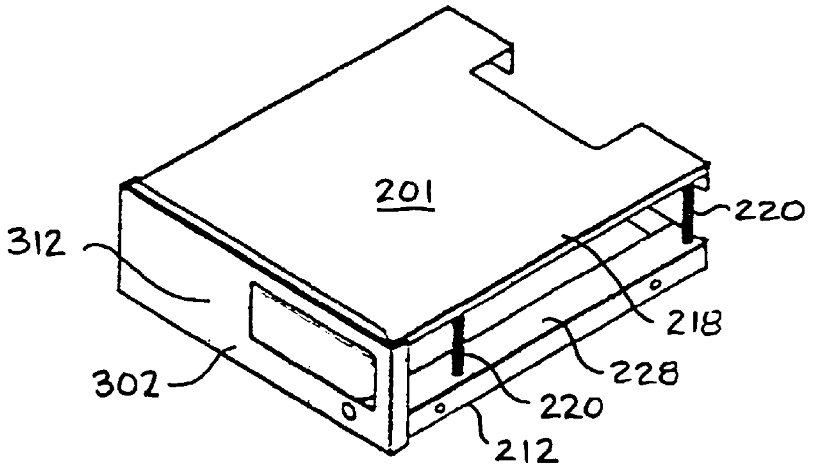
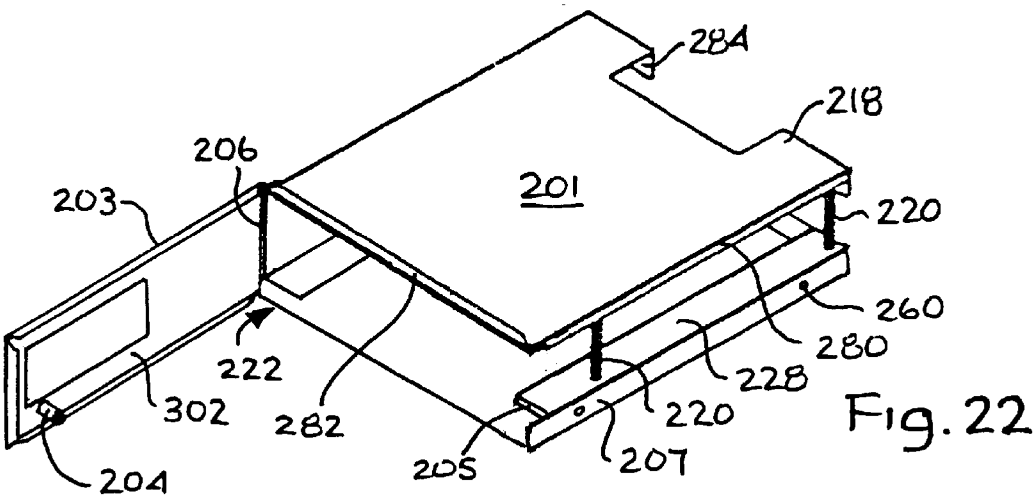
Fig. 22
Fig. 23
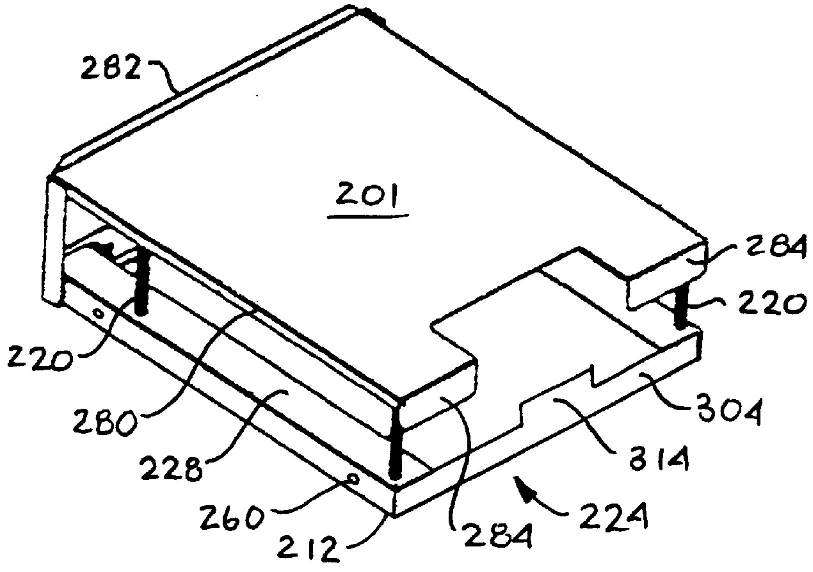

COMPUTER SECURITY DEVICE

FIELD OF THE INVENTION

The invention relates to security devices for various equipment, and more particularly, to security apparatus for preventing theft of and tampering with computer equipment, namely the computer casing and its internal components.

BACKGROUND OF THE INVENTION

Theft of office equipment such as computers from offices, schools and other work places has given rise to a number of methods and a variety of apparatuses for releasably securing the equipment to substantially immovable surfaces. Such surfaces may, for example, comprise the desk or table top, the floor, the side panel of a desk or cabinet, a wall surface or similar. The prior art is replete with devices which are affixed to the computer in one way or another and to which an anchored cable is then secured. Such devices provide little real protection other than as a simple deterrent since the cable can readily be severed with a pair of bolt cutters, for example. Additionally, such devices tend to be inadequate in the prevention of tampering with or pilfering of the components within the computer casing.

By providing apparatus that presents an apparent time-consuming process for its defeat, much theft can be avoided. Whatever else the security apparatus used to secure equipment from theft and tampering comprises, it is desirable that the apparatus not only prevent unauthorized removal and tampering but also readily permit the authorized removal of the equipment for repair and/or replacement. It is also desirable that the security apparatus used have a clean-lined appearance and present an evident security challenge to potential thieves and/or tamperers. It is also mandatory that the security apparatus not interfere with the proper operation of the equipment or the operator thereof.

There is also a need for a simplified secured base apparatus which is both easy to manufacture and install. Further, an inexpensive containment system is needed which is unobtrusive and permits adequate ventilation and access for use of the computer while restricting access to and preventing unauthorized removal of the computer housing and/or docking station.

SUMMARY OF THE INVENTION

The device according to the subject invention provides a novel apparatus for releasably securing a CPU or docking station, as the case may be, to a surface. In general, the device includes a base, a containment structure, fasteners for securing the base to the surface and for fastening the containment structure to the base, and a locking mechanism for preventing access to the fasteners' unfastening elements. The containment structure generally prevents movement of the CPU away from the base. The locking mechanism, in conjunction with the fastened containment structure enclosing the CPU, prevents removal of the base from the surface and removal of the CPU from the base.

Preferably, the base takes the form of an open-ended box with removable and lockable end cover plates or with one fixed cover plate and the other being movable into and out of a locked relationship with the fixed cover plate, hence, the base. The containment structure encloses a CPU for releasably securing various sizes of equipment to a horizontal or vertical surface such as, for example, the upper or under surface of a desk or table, the side panel of a desk, a floor or a wall.

The invention presents a readily apparent theft and tampering challenge to would-be thieves. Fasteners for both the base and the containment means are accessible only in the cavity of the base member and/or behind the end plates which, in turn, are secured by a relatively pick-proof lock. Additionally, all members are comprised of relatively robust high strength steel. The fasteners for the containment means have an inner threaded member enclosed within an outer steel cylinder which can rotate when transverse cutting is attempted, making such an attempt time consuming and frustrating.

A key feature of one embodiment of the invention is its adaptability to a wide range of widths, heights and depths of equipment while using the same manufactured apparatus. The capacity of the invention to be assembled by the user and adjusted to fit specific equipment on site is a major advantage of this apparatus. Easy movement of the device to other surfaces is a further advantage.

The components of this embodiment, while relatively inexpensive to manufacture, are subject to highly volume sensitive pricing. Therefore, the ability of this embodiment to be adjusted to accommodate a wide range of equipment sizes results in major economies of scale which are unavailable in other custom made apparatus.

These and other objects and advantages of the present invention will become apparent from the following detailed description of the invention when taken in conjunction with the drawings wherein:

BRIEF DESCRIPTION OF THE DRAWINGS

FIG. 21 is a front perspective view of the embodiment of FIG. 20 shown in its locked configuration;

FIG. 22 is a front perspective of the embodiment of FIG. 20 shown in its unlocked configuration; and FIG. 23 is a rear perspective view of the embodiment of FIG. 20 shown in its locked configuration;

DETAILED DESCRIPTION OF THE PREFERRED EMBODIMENT

Figure 1:
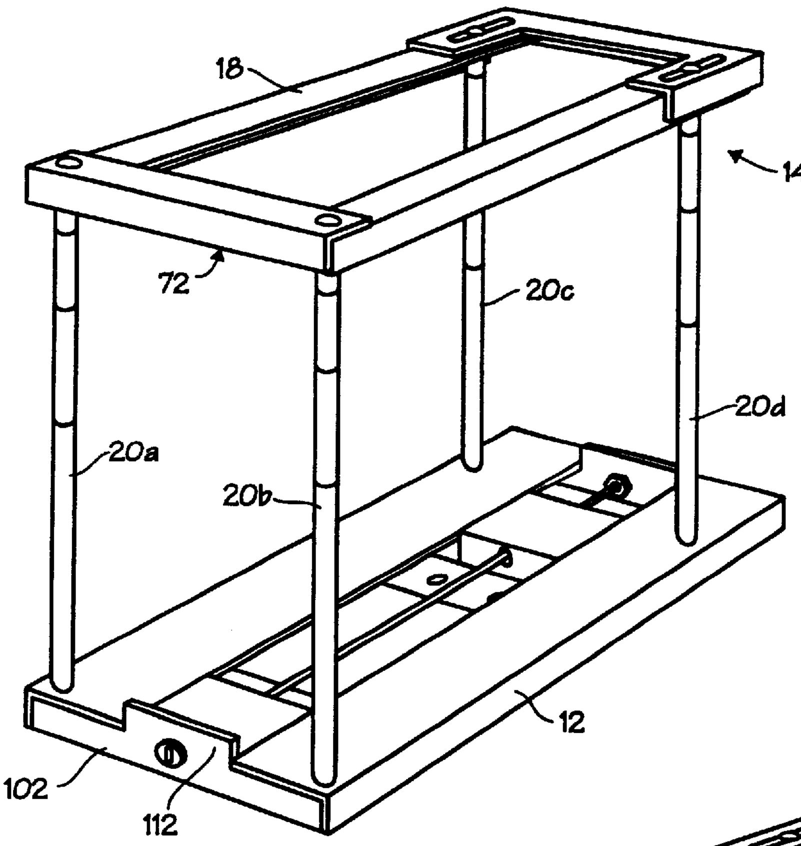
FIG. 1 is a perspective view of the preferred embodiment of the computer security apparatus of the present invention showing the components thereof generally in their assembled configuration, but without the CPU.
Figure 2:
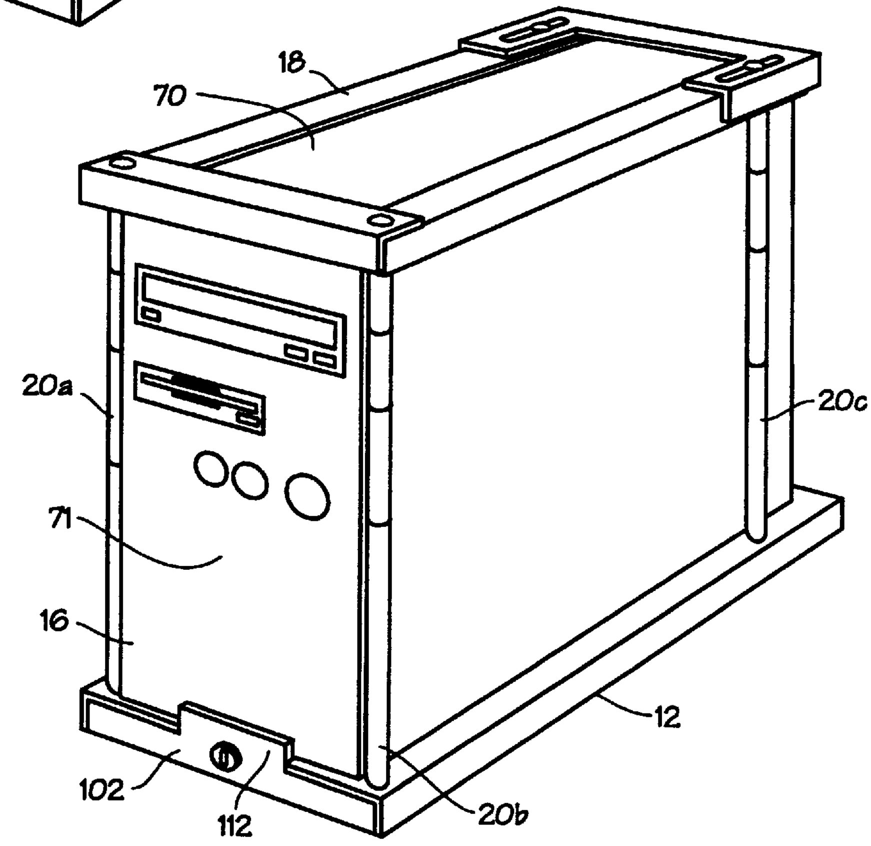
FIG. 2 is a perspective view of the computer security apparatus of the present invention similar to that shown in FIG. 1, with the CPU in situ.

As shown in FIGS. 1 and 2, the computer security apparatus of the present invention is shown generally at 10 and comprises a base 12 and a containment structure 14 in which the computer casing and its contents (which may also encompass a docking station with or without its associated laptop), is denoted collectively herein as the "CPU" 16, are secured to the base 12. The containment structure 14 of the preferred embodiment comprises a frame 18 and a set of connecting members 20*a*, 20*b*, 20*c*, 20*d* by which the frame 18 is connectable to the base 12. Obviously, the end configuration of the containment structure will generally match the configuration of the CPU and it should be noted that while a tower-type CPU is illustrated in FIG. 2, wherein the height and depth of the CPU are significantly greater than its width, principles of the subject invention could readily be adapted to desktop-type CPU's wherein the width and depth of the CPU are significantly greater than its height such as shown in the embodiment illustrated in FIGS. 20–23.

The base 12 of the first embodiment is shown in greater detail in FIGS. 3, 4, 12 and 13 and preferably is in the form of an open-ended rectangular box or sleeve having a first or front open end 22 and a second or rear open end 24. In general, the purpose of the base 12 is to serve as the connecting medium for securing the computer security apparatus 10 to a substantially immovable surface and to provide a space in which elements needed for the disassembly of the apparatus or removal of the apparatus from the surface may be housed. Thereby, by preventing access to this space, an effective deterrent against theft is afforded.

Figure 4:
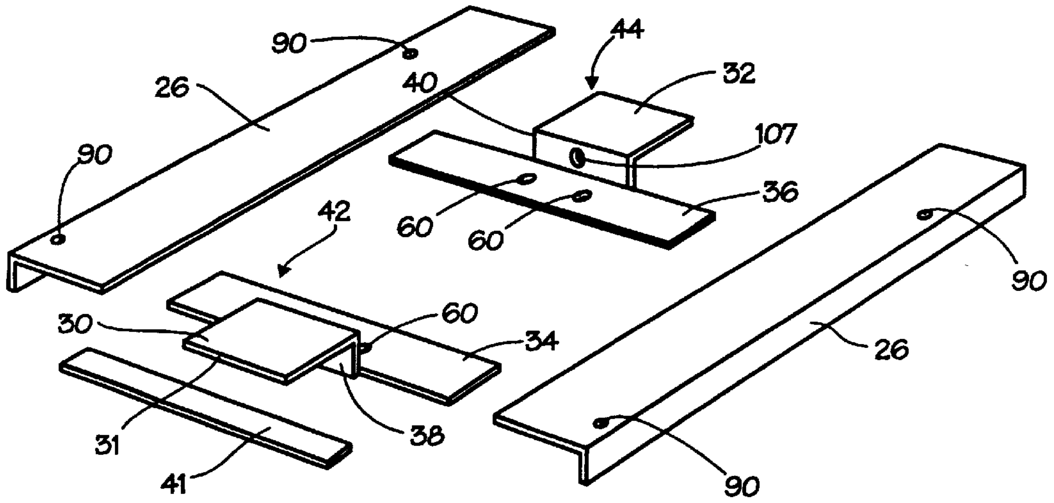
FIG. 4 is an enlarged exploded perspective view of the base of FIG. 3 showing the elements thereof for its manufacture.

The base 12 is preferably formed by a pair of longitudinally-extending L-angles 26 spaced-apart at the upper or CPU-supporting surface 28 by front and rear planar webs 30, 32. Transversely-extending front and rear slats 34, 36 "close" the bottom of the base 12. While a larger continuous plate could serve as the bottom of the base 12 (such as will be shown and described with respect to the embodiment shown in FIGS. 20–23), to save material the associated expense and weight, vertical spacers 38, 40 serve to connect the front and rear planar webs 30, 32 to the respective front and rear slats 34, 36 and, thereby, add to the overall rigidity of the base structure 12. A transversely extending stop plate 41 is provided across the bottom of the base 12 and, for reasons which will be explained below, slightly inset from the edge of the front open end 22. Advantageously, the associated web, spacer and slat can be formed from a single piece of sheet material and bent in a bending operation (as shown in FIG. 4) into respective front and rear Z-shaped elements 42, 44. The two L-angles 26 are then welded to the stop plate 41 and the Z-shaped elements 42, 44, to form the base 12. The front Z-shaped element 42 is positioned such that the front edge 31 of the front planar web is inset slightly from the front end 22 while the rear Z-shaped element 44 is positioned such that the rear planar web 32 being spaced significantly more inwardly from the rear end 24. This arrangement provides for an opening 52 in the upper surface 28 of the base 12 and a slot 54 at one end of the base 12, the purposes for which will be described hereinafter.

Figure 3:
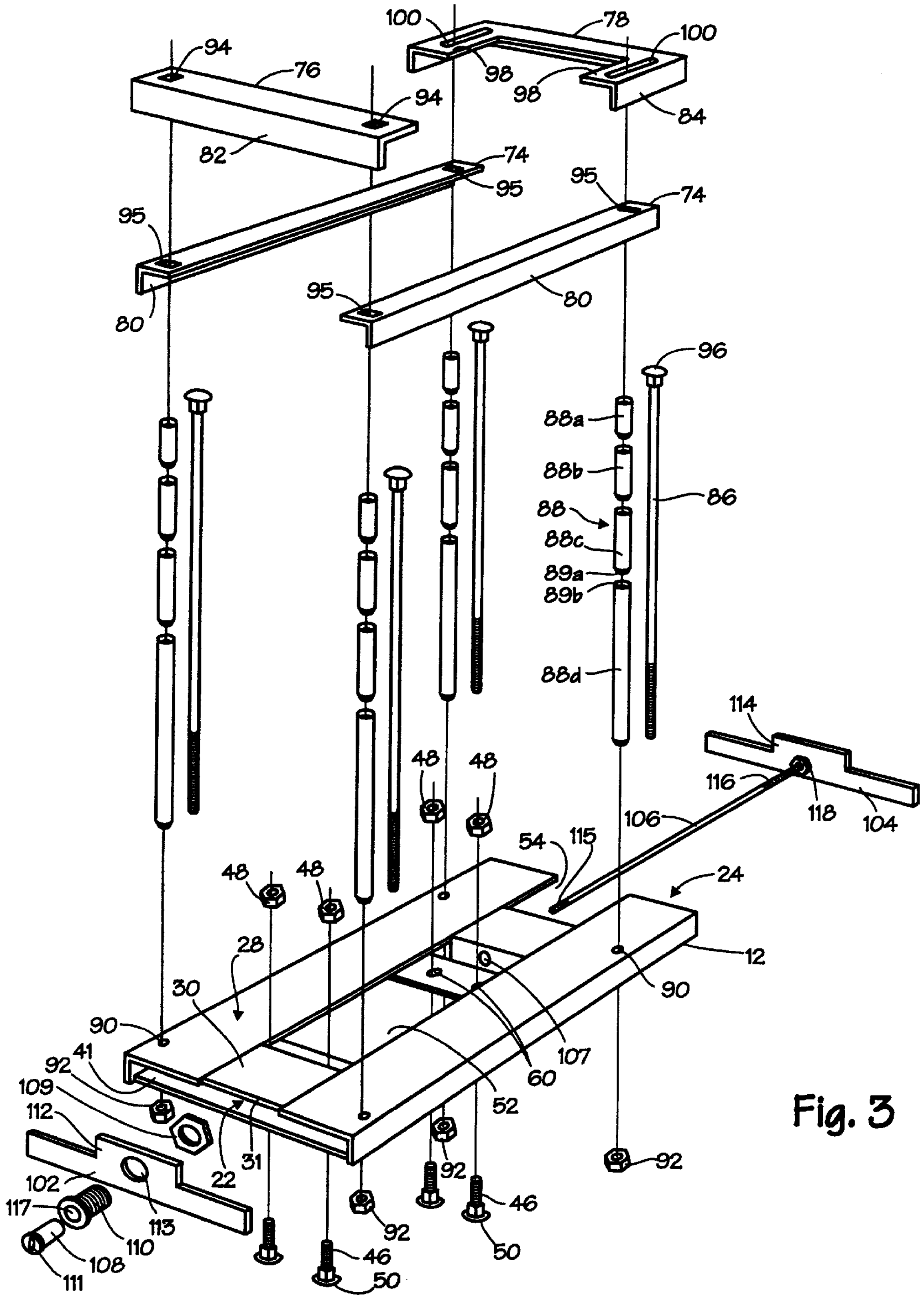
FIG. 3 is an exploded perspective view of the computer security apparatus of FIG. 1 showing the manner in which the components of the preferred embodiment are assembled.
Figure 9:
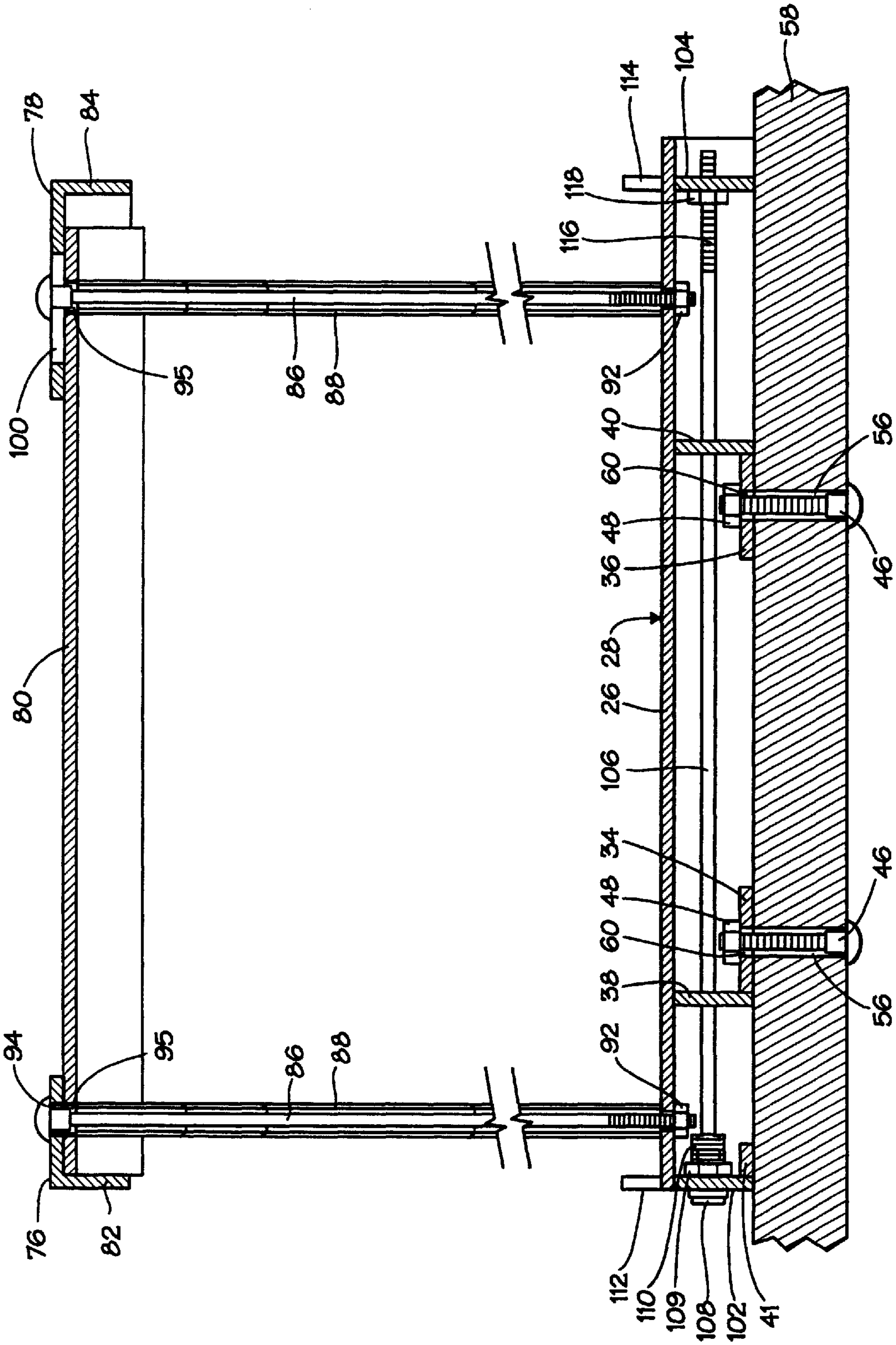
FIG. 9 is an enlarged cross-sectional elevation of the computer security device as seen along lines 9—9 of FIG. 6, showing the manner in which the apparatus is secured to a surface.

The base 12 is mountable to a surface by means of suitable fasteners. The fasteners used must have the "unfastening" element thereof within the base 12 to prevent removal of the entire security apparatus 10 containing the CPU 16 from the surface. For purposes of illustration, the embodiments described herein presuppose the surface to be horizontal and of a limited thickness so as to permit through-fasteners to be used. However, it is contemplated that the surface may be vertical or that attachment to the surface may be from below rather than atop. As shown in FIGS. 3 and 9, the base fasteners comprise carriage bolts 46, which have smooth, rounded heads 50 with no means evident (such as screwdriver slots) for their unfastening, and associated nuts 48.

Holes 56 may be pre-drilled in surface 58 (see FIG. 9) using apertures 60 in both base slats 34, 36 as a template. The carriage bolts 46 are then inserted upwards through holes 56, through the corresponding apertures 60 and then, with access through the opening 52, bolts 46 are fastened with nuts 48, thereby securing base 12 to surface 58. It will be appreciated that where desired, the base fasteners could be of the "blind-type", such as for example screws, which are screwed directly into the surface 58 through the apertures 60 in the base. As with the through-type fastener mentioned above, the means by which the screws are unfastened, i.e. their heads, are contained within the base 12 so that access thereto is prevented when the CPU 16 is locked in place.

As indicated above, the preferred containment structure 14 for the CPU 16 comprises a frame 18 and a plurality of connecting members 20*a*, 20*b*, 20*c*, 20*d*. In general, the frame 18 primarily restrains the CPU 16 from movement away from the base in a direction generally perpendicular thereto. It is, therefore, configured to overlap horizontally at least one pair, and preferably both pairs, of opposed upper edges of the top surface 70 of the CPU 16, as shown in FIGS. 2 and 11. In the preferred embodiment illustrated in FIGS. 1 to 3 and 6 to 11, the frame 18 also includes a vertically depending skirt 72 which can enhance the security of the apparatus 10 and which can provide additional advantages as will be detailed hereinafter.

Figure 10:
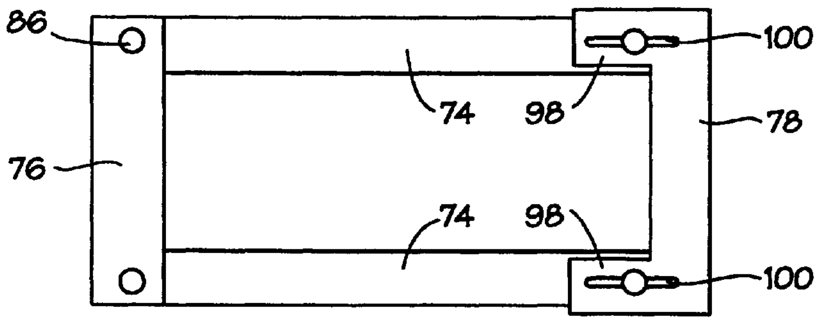
FIG. 10 is a plan view of the computer security apparatus as seen in FIG. 7 with the base portion removed for clarity.
Figure 11:
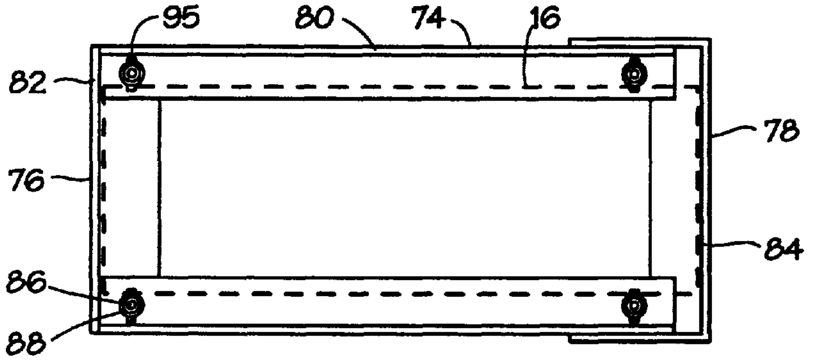
FIG. 11 is a cross-sectional view of the computer security apparatus as seen along lines 11—11 of FIG. 7.
Figure 12:
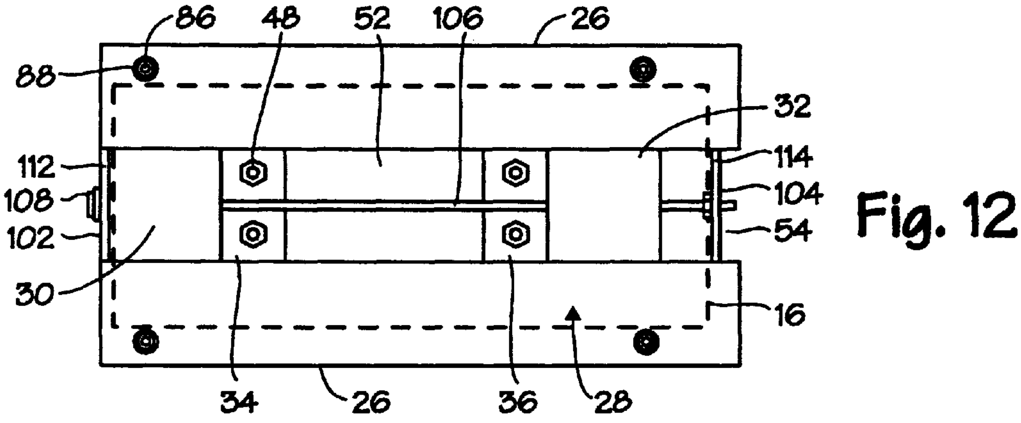
FIG. 12 is a cross-sectional view of the computer security apparatus as seen along lines 12—12 of FIG. 7.
Figure 13:
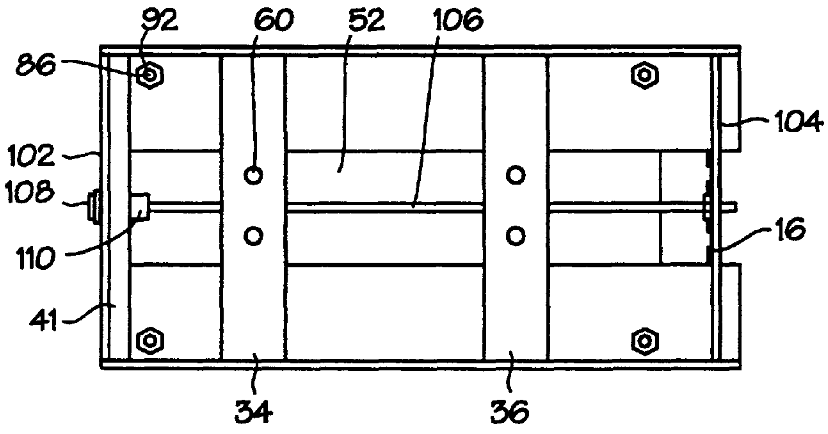
FIG. 13 is a bottom view of the computer security apparatus as seen as seen along lines 13—13 in FIG. 76.

Preferably, the frame 18 is comprised of a pair of longitudinally-extending side members 74 spaced-apart by a first or front end member 76 and a second or rear end member 78, as shown best in FIGS. 3, 10 and 11. Each of the frame members, 74, 74, 76, 78 is provided with a depending vertical extension 80, 80, 82, 84, respectively, which collectively form the aforementioned skirt 72. Preferably, the frame members are fabricated from relatively heavy gauge, common L-angle stock. Four connecting members 20*a*, 20*b*, 20*c*, 20*d* serve to attach the frame members 74, 74, 76, 78 together as well as to connect the frame 18 to the base 12. As can be seen in FIGS. 2, 11 and 12, they also serve to prevent movement of the CPU 16 in a lateral direction parallel to the surface 28 of the base 12 when the frame 18 is configured as shown in FIGS. 1 to 3 and 6 to 13. In this regard, the pair of members 20*a*, 20*c* and 20*b*, 20*d* on each side of the CPU are spaced apart longitudinally a distance less than the expected minimum CPU depth.

Preferably, the connecting members 20*a*, 20*b*, 20*c*, 20*d* each comprise a long, square-neck carriage bolt 86 and include a tubular shield 88 surrounding the portion of the bolt 86 extending between the frame 18 and the base 12 as shown in FIG. 9. The shield 88 also provides a support function for the frame 18 in absence of the CPU 16. As can be seen in FIGS. 3 and 9, the carriage bolts 86 extend through holes 90 in the upper surface 28 of the base 12, and are fastened within the base with nuts 92 accessed through the open front and rear ends 22, 24 of the base 12.

Preferably, the tubular shields 88 each comprise a plurality of tubular sections 88*a*, 88*b*, 88*c*, and 88*d*, as shown in FIG. 3. By providing a plurality of similar or varied length tubular sections, most heights of CPU's can be accommodated with the appropriate selections thereof. With respect to the carriage bolts 86, these can be provided in a length which corresponds to the maximum anticipated height of CPU's and can then be cut to suit. Preferably, the shields 88 are made from high-strength, cut-resistant material. They are also designed to permit relatively free rotation about the respective bolt body to further resist cutting such as by a hacksaw.

Where a plurality of tubular sections 88*a*–88*d* are provided, it is preferred that these sections be nestable so as to prevent access to the bolt bodies between adjacent sections, to maintain vertical alignment, and to facilitate assembly by enabling the sections to substantially remain together. In this regard, mating, non-self-locking male and female tapers 89*a*, 89*b* are preferred, as shown in FIG. 3.

Squares holes 94 are provided at or near the ends of the front frame member 76 in which the square neck portions of the carriage bolts 86 are received to prevent the bolts 86 from turning when nuts 92 are being tightened. Side members 74 are provided with transversely-extending slots 95 through which bolts 86 extend. The purpose of the slots 95 will be described hereinbelow. As with the heads 50 of the base fasteners 46, the heads 96 of the connecting member fasteners, i.e. carriage bolts 86, are smoothly rounded to prevent their unfastening.

In order to accommodate for variability in the depth of the CPU, the rear end member 78 is U-shaped and includes a pair of longitudinally-extending legs 98. Each leg 98 includes a slot 100 adapted to accommodate the square neck portion of the respective carriage bolts 86. The width of slots 100 is sufficient to accommodate the square neck portion of the respective carriage bolt 86 to prevent its rotation therein when being tightened. The slots 100 permit the frame 12 to be expanded or contracted in the longitudinal direction to suit CPU's of varying depths.

A lockable end cover arrangement is provided to control access to the fasteners within the base 12. As shown in FIGS. 1–3, 9, 12 and 13, the locking mechanism operates between a pair of end cover plates 102, 104 correspondingly configured to the shape of the openings 22, 24 in the base 12. A lockably detachable connecting rod 106 is connected through apertures 107 in both vertical spacers 38, 40 and ultimately between the end plates 102, 104.

Figure 5:
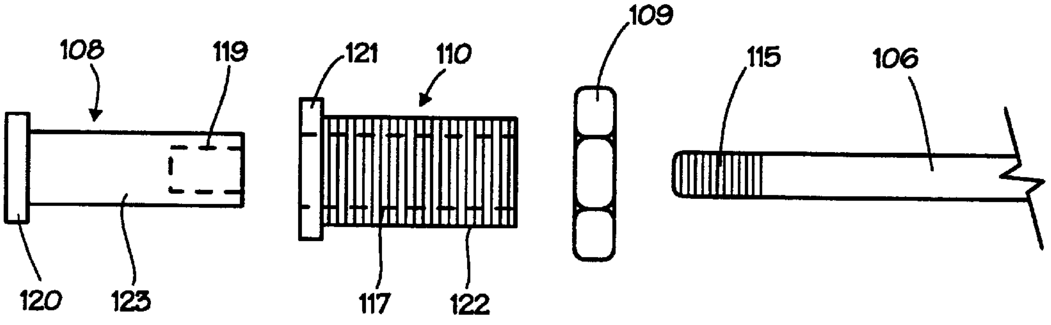
FIG. 5 is an enlarged side view showing the components of the lock mechanism in detail.

The preferred lock mechanism for the embodiment with two removable cover plates is shown in greater detail in FIG. 5. A generally cylindrical lock casing 110 is provided which includes a lock chamber 117, a threaded body 122 and a flange 121. The lock casing 110 is disposed in aperture 113 in the front cover plate 102 such that the flange 121 abuts the outer surface of the front cover plate 102. Locknut 109 is threaded onto the matingly threaded body 122 and tightened against the inner surface of the front cover plate 102. The connecting rod 106 is provided with a threaded distal end 115 which, when the cover plate is positioned to cover opening 22 in the base 12 and the connecting rod 106 is attached to the rear cover plate 104, as described hereinbelow, and inserted through apertures 107 in both Z-shaped members 44, 42, the end 115 will be generally aligned with and in chamber 117. A lock cylinder 108 has a cylindrical body portion 123 adapted to be received in chamber 117 and a pick-resistant, keyed lock operator 111 is provided to lock the cylinder 108 within casing 110 as is known in the art. The cylinder 108 includes a threaded socket 119 which is adapted to threadingly receive the distal end 115 of the connecting rod 106 and a flange 120 which acts as a stop to ensure the cylinder 108 is positioned at the proper depth within the chamber 117.

The end plates 102, 104 are provided with upwardly extending tabs 112, 114, respectively, which serve as backstops for the CPU 16 to prevent its removal in a longitudinal direction when the end plates 102, 104 are locked together. Thus, the locking mechanism of the present invention serves a dual purpose in preventing access to the base fasteners 48 and containment structure fasteners 92 as well as retaining or assisting in retaining the CPU within the containment structure 14.

To allow some adjustability in the apparatus 10 for various depths of CPU's, the connecting rod 106 is connectable at the rear end plate 104 in such a manner as to permit the effective length of the connecting rod 106 to be varied. One such way, as shown in FIGS. 3 and 9, is to provide a threaded proximal end 116 on the connecting rod 106, corresponding mating threads in the aperture 124 in the rear end plate 104 itself and a locking nut 118 for locking the connecting rod 106 in a predetermined position. This way, adjustment of the spacing between the end plates 102, 104 is governed by the initial length of the connecting rod 106 and the extent to which the threaded end 116 protrudes through the end plate 104. The connecting rod 106, with the locking nut 118 on the threaded portion 116, is threaded into the aperture 124 of the rear plate 104 to a depth whereat the distance between the tabs 112 and 114, when the plates 102, 104 are locked together, corresponds to the depth of the CPU 16. The locking nut 118 is then tightened against the rear plate 104 to lock the connecting rod in this position at this length.

As indicated above, the shape of the front and rear plates 102, 104 in this embodiment is such as to permit accommodation within the respective open ends 22, 24 of the base 12. With respect to the rear plate 104, when the connecting rod 106 is positioned through apertures 107 in the Z-shaped elements 42, 44 of the base 12, the rear plate 104 is slidable within the rear open end 24 of the base since the tab 114 projects though slot 54 in the upper surface 28 of the base 12. The rear plate 104 is prevented from rotation and/or translation once the lock cylinder 108 is threaded onto the distal end 115 of the connecting rod 106 and subsequently locked within lock chamber 110. The front plate 102 seats within the opening 22 of the base 12 with its tab 112 abutting the edge 31 of front planar web 30 of the Z-shaped element 42 and with its lower edge abutting the stop plate 41. As mentioned above, the stop plate 41 is inset from the front edge of the opening 22 a distance substantially equal to the thickness of the front plate 102 so as to provide a flush fit and to prevent rotation and/or translation of the front plate 102 during assembly.

To secure a CPU 16 to a surface 58, the effective length of the connecting rod 106 is ascertained and set as indicated above. The base 12 is fastened to the surface 58 by inserting bolts 46 up through pre-drilled holes 56, through the apertures 60 in the base 12 and then fastening the bolts 46 therein by nuts 48. The CPU 16 is then positioned on the supporting surface 28 of the base 12 covering opening 52 and, hence, the base fasteners, with the front face 71 of the CPU 16 generally aligned vertically with the front edge 31 of the planar web member 30. The longitudinally extending side frame members 74, 74 are placed along the upper longitudinal edges of the CPU 16 with their slots 95 in vertical registration with the holes 90 in the base. The front frame member 76 is positioned on the side frame members 74, 74 with its square holes 94 in registration with the respective slots 95 and with the vertical extension 82 abutting the front 71 of the CPU 16. By precise location of the holes 90 in the base and the square holes 94 of the front frame member 76 in relation to the vertical extension 82 and the front edge 31 of the planar web member 30, respectively, during manufacturing, abutment of the vertical extension 82 and the tab 112 of the front lock plate 102 against the front face 71 of the CPU 16 is assured. The rear frame member 78 is positioned so that its slots 100 are in registration with the respective slots of the side frame members 74, 74 with the vertical extension 84 of the end member 78 abutting the back of the CPU 16 (see FIG. 7).

A combination of tubular sections 88*a*, 88*b*, 88*c*, 88*d* is selected and nested to form a shield 88 which substantially matches the height of the CPU 16. The front carriage bolts 86 are then inserted through square holes 94 in the front frame member 76, through the respective slots 95 of the side frame members, through the shields 88, through holes 90 in the base, and then, with access through the front open end 22, fastened with nuts 92, as shown in FIG. 9, thereby forming connecting members 20*a*, 20*b* (see FIG. 1). Likewise, rear carriage bolts 86 are inserted through slots 100 in the rear frame member 78, through the respective slots 95 of the side frame members; through the shields 88, though holes 90 in the base, and then, with access through the rear open end 24, fastened with nuts 92, as shown in FIG. 9, thereby forming connecting members 20*c*, 20*d* (see FIG. 1).

Once the CPU 16 has been secured to the base 12, the connecting rod 106, which is now attached to rear plate 104, is inserted in rear opening 24 of the base, through apertures 107 in the vertical spacers 40, 38 while the front plate 102 is positioned in the recess at the front end 22 of the base 12 so that the distal end 115 of the connecting rod 106 registers with the with the lock chamber 117 of lock casing 110. The plates 102, 104 are then locked by insertion of the lock cylinder 108 into the chamber 117. The cylinder 108 is rotated by means of the lock operator 111 to thread the socket 119 onto the distal end 115 of the connecting rod 106. Once the cylinder 108 is secured to the connecting rod 106, the lock operator 111 is activated to lock cylinder 108 within the casing 110, hence locking cover plates 102, 104 in position and, thereby, preventing access to the fastening elements (nuts 92) of the CPU containment structure 14.

Figures 6, 7, 8:
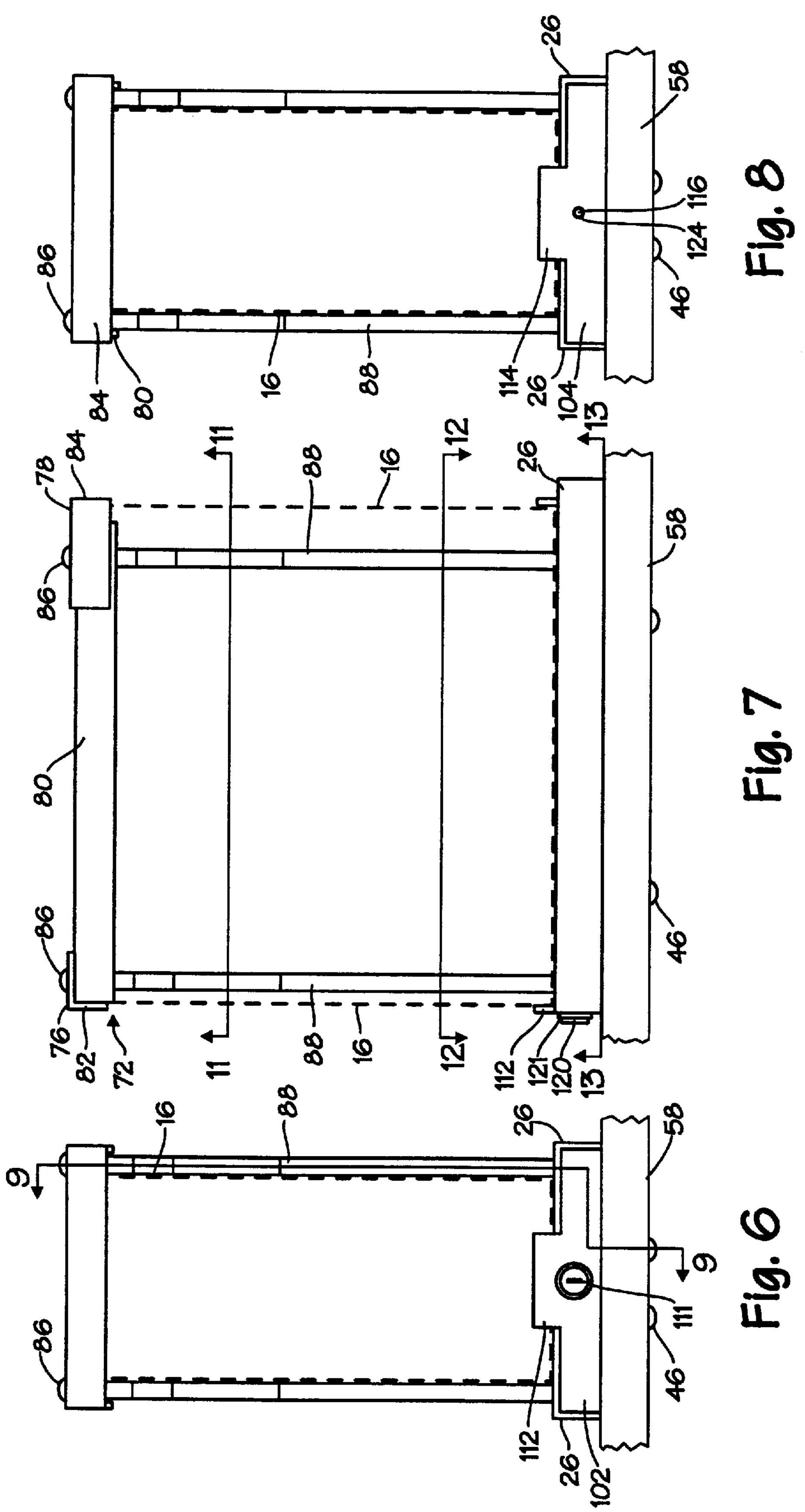
FIGS. 6, 7 and 8 are front, side and rear elevations of the computer security apparatus of FIG. 1.

As can be seen in FIGS. 6 to 8, the CPU 16 is prevented from removal in the longitudinal direction by both the vertical extension 82 of the front frame member 76 and the tab 112 of the front plate 102 at the front of the CPU 16 and by both the vertical extension 84 of the rear frame member 78 and the tab 114 of the rear plate 104 at the rear of the CPU 16. The extensions 82, 84 and the tabs 112, 114 extend sufficiently vertically so as to prevent the components of the CPU from being removed through removal of the CPU's casing but also so as to provide adequate access to the front and rear panels of the CPU 16 for its operation. The CPU 16 is restrained against lateral removal by the pairs of connecting members 20*a*, 20*c* and 20*b*, 20*d* and against upward or generally perpendicular removal by the frame 18 and its securement to the base 12 by also by the connecting members 20*a*, 20*b*, 20*c*, 20*d*.

Removal of the CPU 16 requires not only unlocking the front and rear cover plates 102, 104, but also unfastening of at least the front or rear pair of nuts 92, which can be awkward and relatively time-consuming due to the limited access through the front or rear openings 22, 24. However, such an arrangement is advantageous in that, even while a highly pick-resistant lock operator 111 is preferably provided, if the lock is defeated, it would take not only time but tools a would-be-thief may not have to unfasten nuts 92 to permit removal of one of the front or rear frame members 76, 78 to thereby enable removal of the CPU 16. Since this arrangement presents an evident time-consuming process, it acts as an effective deterrent in most situations since time is not a luxury thieves can typically afford.

Figure 14:
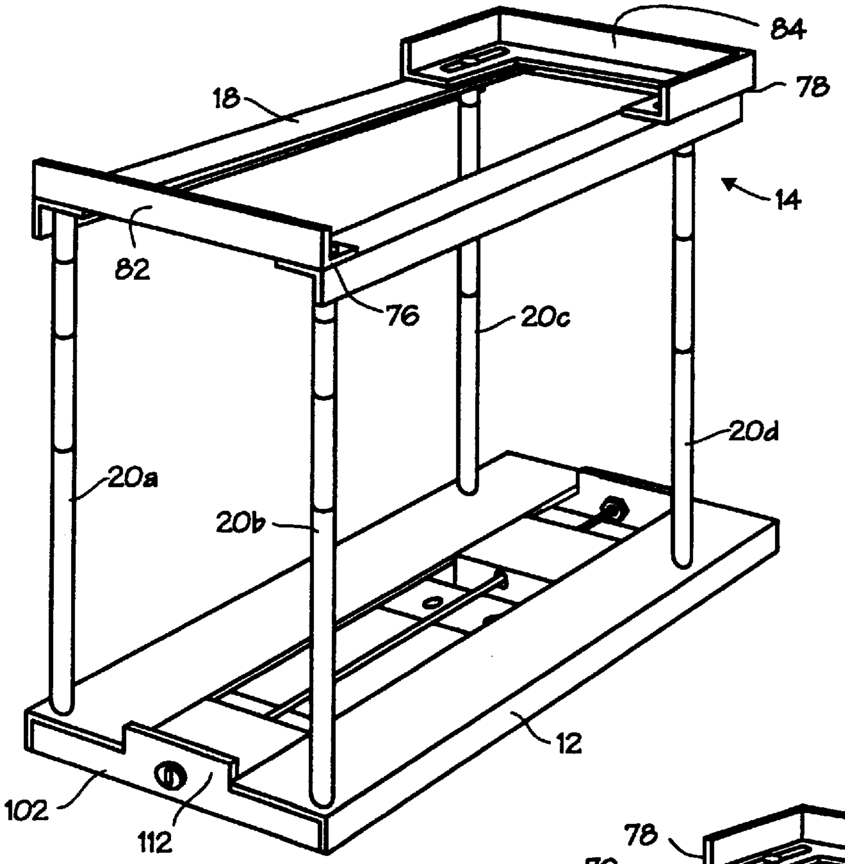
FIGS. 14 and 15 are perspective views similar to FIGS. 1 and 2 (with and without the CPU), showing the usage of the frame elements in a first alternate arrangement.
Figure 15:
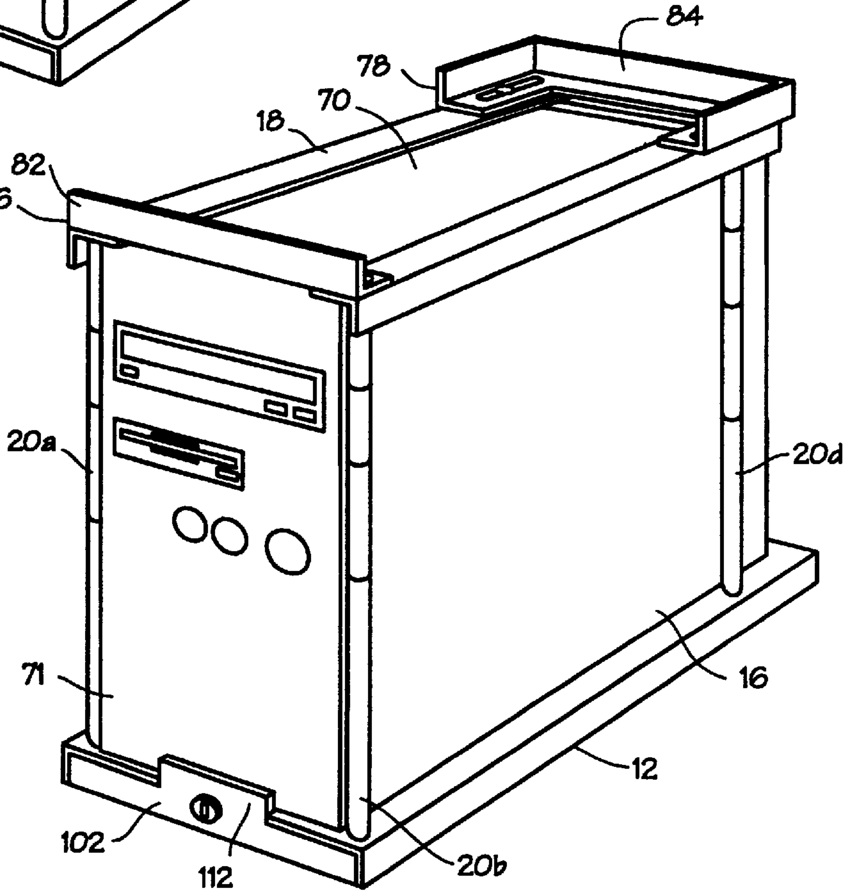

However, while this arrangement serves to prevent theft and tampering with the CPU, it also deters access and/or removal of the CPU for legitimate purposes such as for repair, maintenance, component replacements, upgrades, etc. Where frequent authorized removal of the CPU is desired, the present invention provides a solution therefor through the mere inversion of the front and rear frame members 76, 78, as shown in FIGS. 14 and 15. With the vertical extensions 82, 84 of the front and rear frame members 76, 78 no longer abutting the CPU 16, the CPU 16 may readily be removed from the containment structure simply by unlocking the front and rear cover plates 102, 104.

Figure 16:
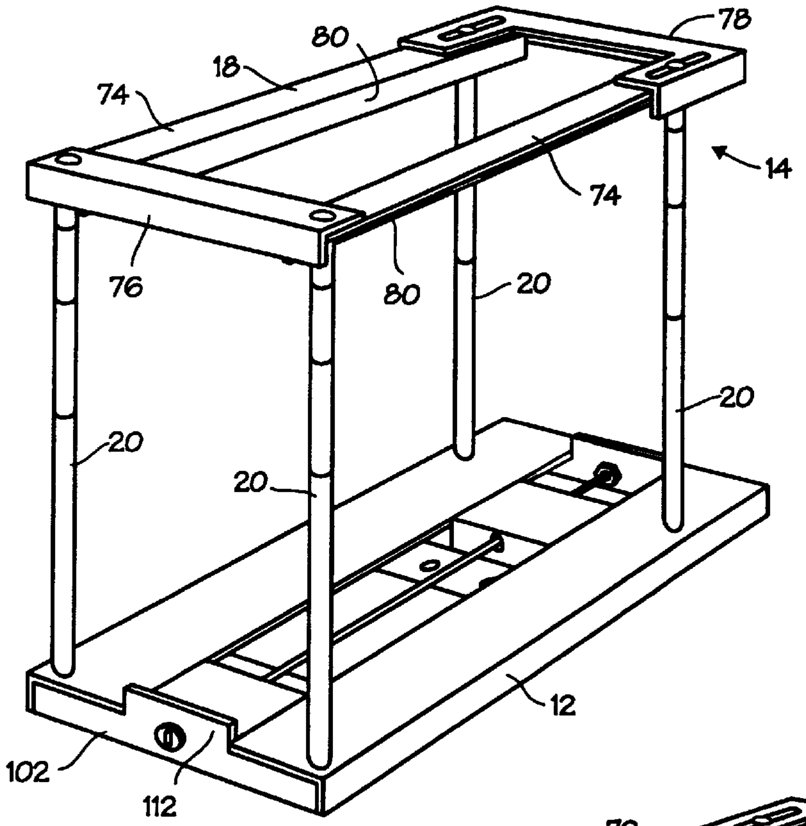
FIGS. 16 and 17 are perspective views similar to FIGS. 1 and 2 (with and without the CPU), showing the usage of the frame elements in a second alternate arrangement.
Figure 17:
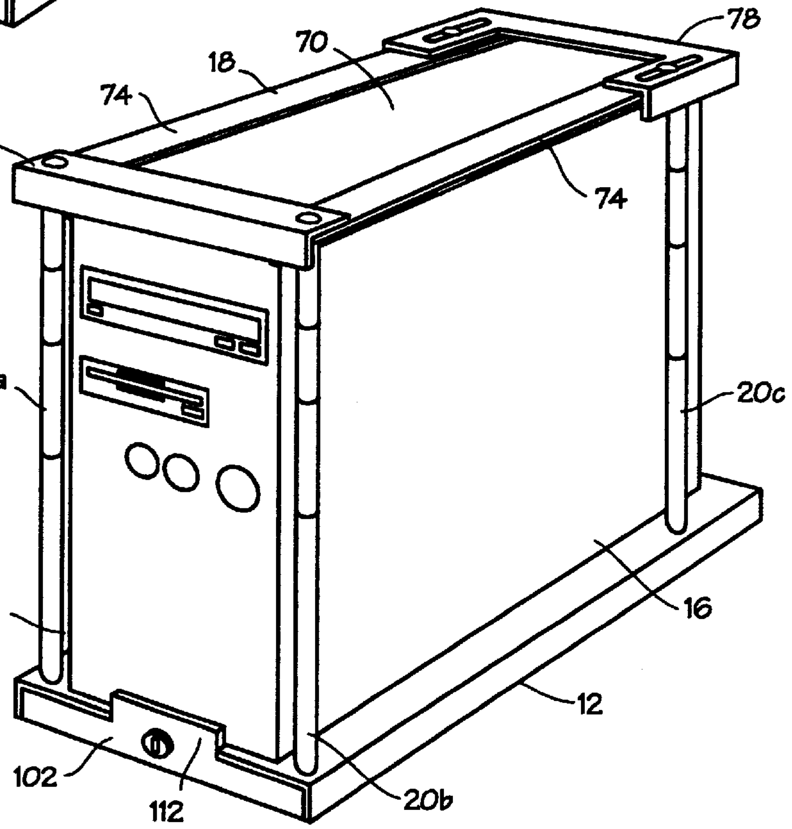

As indicated above, the present invention can provide adjustability with respect to the height of the CPU through proper selection of length of tubular shield 88 (or tubular sections 88*a*, 88*b*, 88*c*, 88*d*) and carriage bolts 86. Adjustability with respect to CPU depth is accommodated via the selection of an appropriate effective length of the connecting rod 106 between the locking tabs 112, 114 of the front and rear cover plates 102, 104, and through elongation of the frame 18 by movement of the rear frame member 78. In order to accommodate for small variations in the width of the CPU, the side members 74 of the frame 18 may be arranged so that one or both of the vertical extensions 80 are positioned interiorly of the connecting members 20*a*, 20*c* and 20*b*, 20*d* as shown in FIGS. 16 and 17, thereby reducing the width parameter across the frame 18. In this orientation, further reduction in the width parameter is possible due to the aforementioned provision of the transversely extending slots 95 in the side frame members 74. In this case, the horizontal portions of the front and rear frame members 76, 78 overlap opposed upper edges of the CPU and, thereby, serve to prevent removal of the CPU in a direction perpendicular to the base.

Figure 18:
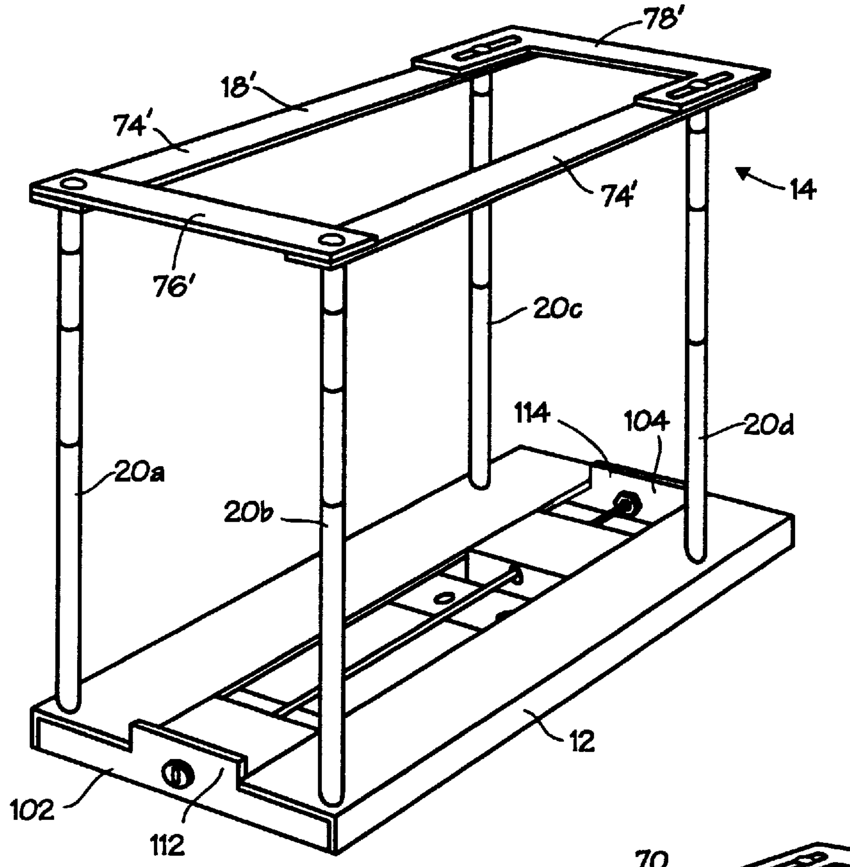
FIGS. 18 and 19 are perspective views similar to FIGS. 1 and 2 (with and without the CPU), showing the usage of an alternate frame.
Figure 19:
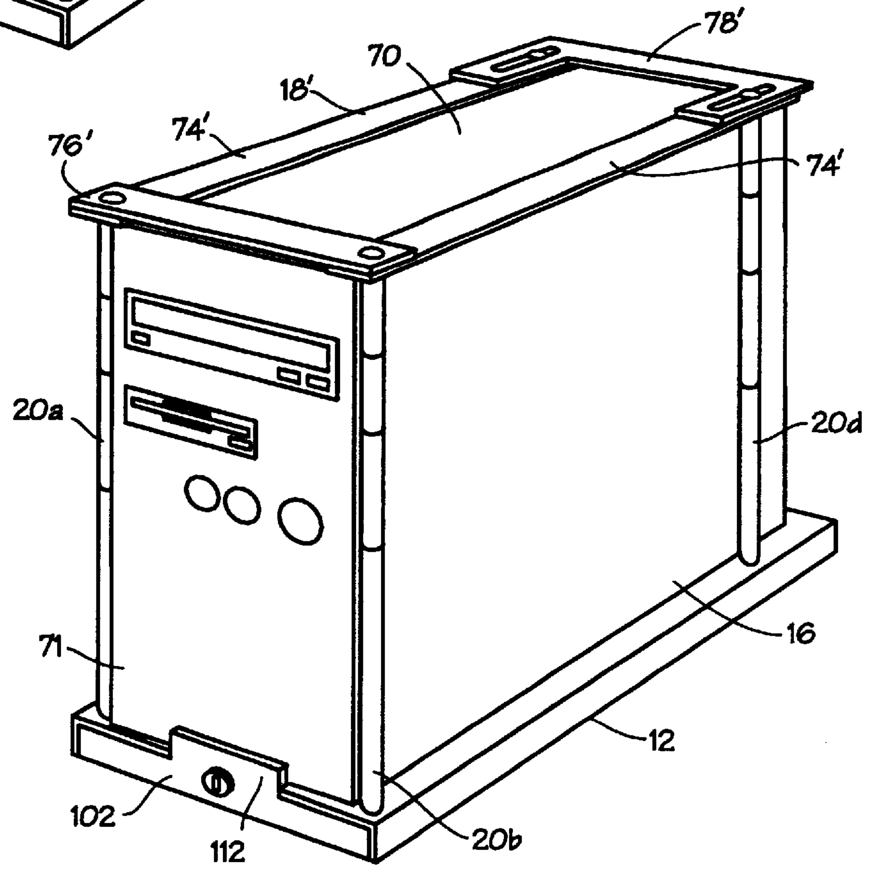

FIGS. 18 and 19 show an alternate frame 18' in which none of the frame elements, namely the side frame members 74', the front frame member 76' or the rear frame member 78', are provided with vertical extensions. This frame arrangement 18' overlaps the upper edges of the CPU 16 in the horizontal direction and functions in the same manner as the arrangement shown in FIGS. 14 and 15 in the prevention of removal of the CPU 16 in an upward, generally perpendicular direction with respect to the base. Lateral removal of the CPU 16 is likewise prevented since the minimum depth of the CPU exceeds the distance between corresponding pairs of connecting members 20*a*, 20*c* and 20*b*, 20*d*.

FIGS. 20 to 23 show a second embodiment of the invention adapted to accommodate docking stations for laptop computers or desktop-type CPUs wherein the width and depth of the docking station or CPU (not shown) are significantly greater than its height. Like features of this second embodiment with respect to the apparatus 10 are identified with reference numerals incremented by two-hundred. The apparatus 210 shown in FIGS. 20 to 23 also illustrates an alternate frame 218 which consists of a single plate or rigid sheet which may be bent at its outer periphery to form the vertical extensions 280, 282, 284. The upper surface 201 of the frame 218 may be used to support a computer monitor (not shown). Connecting members 220 are similar to the connecting members 20 of the first embodiment.

Figure 20:
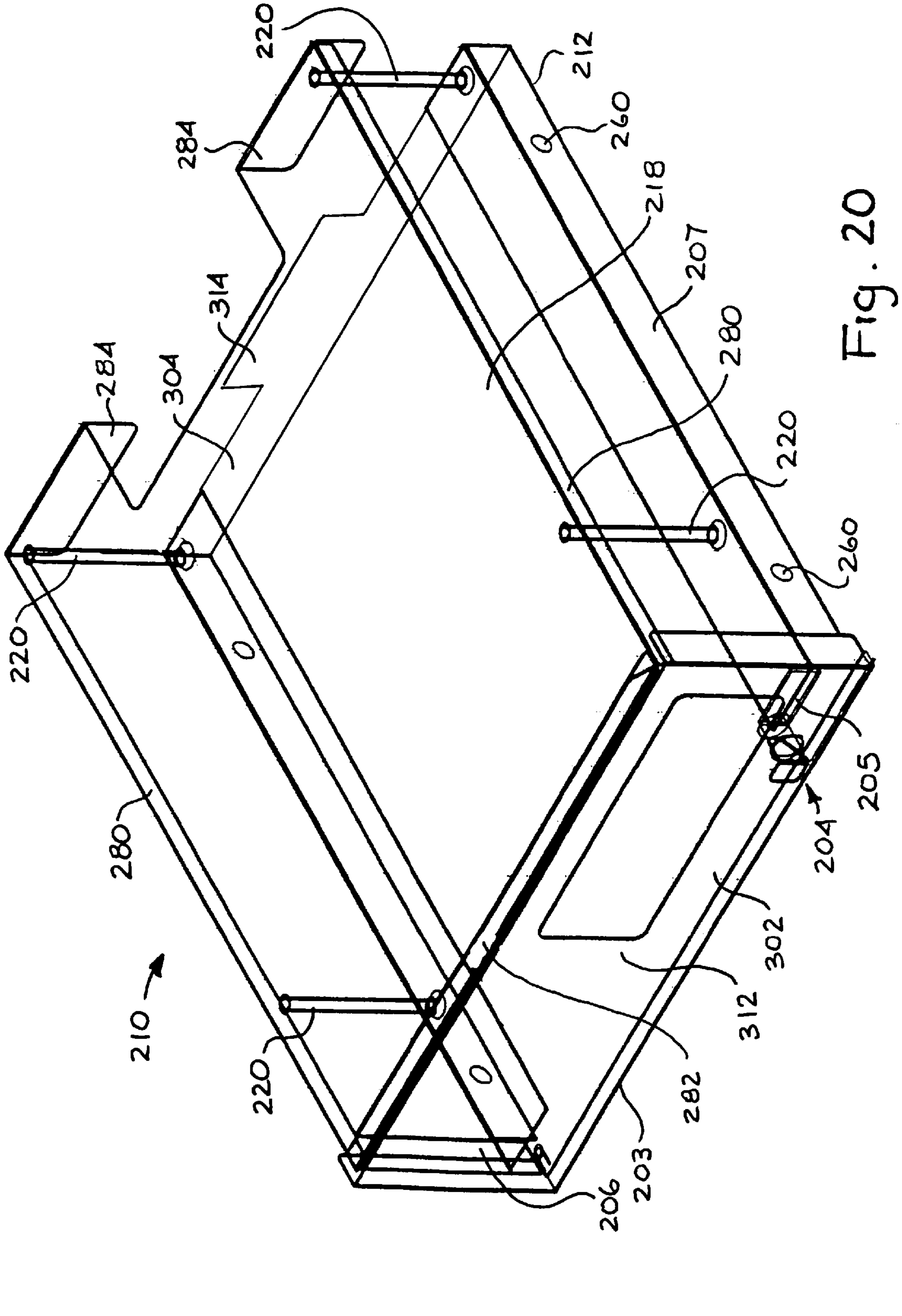
FIG. 20 is a perspective view of the invention as adapted to accommodate desktop-type CPU's or a docking station with or without its attached laptop computer shown in wire frame to reveal more details thereof.

An alternate base 212 is also provided having opposed sides 207 bent upwards and inwards to form the supporting surface 228 for the docking station. The rear plate 304 and its tab 314 is fixed in position thereby closing the rear end 224 of the base 212 (see FIG. 23). The blocking tab 312 is largely extended so that the tab 312 and front plate 302 act a door 203 (see FIG. 22). In this case, instead of being removable like the front cover plate 102 of the first embodiment, the front plate/door 302/203 of this embodiment is movable into and out of a position closing the front end 222 of the base 212 by provision of a hinge 206, which while shown vertically in FIGS. 20 and 21, may be disposed horizontally at either the base 212 or the front portion of frame 218. The front plate/door 302/203 is lockable in the closed position by suitable lock means. As shown in FIGS. 20 and 22, lock 204, which may be of the standard cam-type, is securable against a catch 205 provided on a portion of base 212. As an alternate arrangement for fastening the base 212 to a surface, apertures 260 are provided in the sides 207 of the base 212 of which one or more may be used to connect a security cable (not shown) which, in turn, is duly secured so that the apparatus 210 is not removable.

While there has been described herein and illustrated in the drawings particular embodiments of the computer security apparatus according to the present invention, it is to be understood that various modifications, adaptations and substitutions may be made thereto without departing from the spirit and scope of the invention as defined in the appended claims. For example, many of the features shown in connection with the second embodiment of the invention may be employed in conjunction with the first embodiment and vice versa.

We claim:

1. A security apparatus for preventing theft of a CPU and/or tampering with components contained within the CPU, comprising:

a generally rectangular, base adapted to be fastened to a substantially immovable surface by means of a plurality of first fasteners, the base having opposed first and second open ends and a generally planar, upper, CPU-supporting surface having at least one opening through which the first fasteners are accessible, said opening being covered by the CPU when the CPU is positioned on the CPU-supporting surface;

containment means fastenable to the base by a plurality of second fasteners for restraining movement of the CPU in a lateral direction with respect to the end-to-end relation of the base and for restraining movement of the CPU in a generally perpendicular direction with respect to the base, said second fasteners being accessible through the open ends of the base;

a pair of removable cover plates for preventing access through the open ends of the base, each plate having a tab which projects above the upper CPU-supporting surface of the base; and locking means for locking the cover plates in a spaced-apart relation with the tabs preventing movement of the CPU in a longitudinal, end-to-end direction with respect to the base.

2. The security apparatus as claimed in claim 1, wherein the locking means is adjustable to vary the distance between the tabs of the cover plates and wherein the base has a slot in its upper surface extending inwardly from one of the open ends of the base through which the tab of a respective one of the cover plates can slide to accommodate variations of the CPU depth.

3. The security apparatus as claimed in claim 1, wherein the locking means comprises a connecting rod having distal and proximal ends, said proximal end being attachable to one of said cover plates, a lock chamber affixed to the other of said cover plates, and a lock cylinder attachable to the distal end of said connecting rod, said lock cylinder being adapted to be lockingly received in said lock chamber.

4. The security apparatus as claimed in claim 1, wherein said containment means comprises:

a generally rectangular frame which overlaps at least two opposed edges of the surface of the CPU which is opposite the surface to be supported on the base, said frame being connectable generally at its corners to said base through two pairs of generally parallel connecting members, the members of each pair being spaced-apart less than the predetermined minimum expected depth of the CPU and the pairs of members being spaced-apart so as to accommodate the CPU therebetween.

5. The security apparatus as claimed in claim 3, wherein the effective length of said connecting rod is variable.

6. The security apparatus as claimed in claim 4, wherein said connecting members comprise said second fasteners.

7. The security apparatus as claimed in claim 4, wherein said frame is disassemblable.

8. The security apparatus as claimed in claim 4, wherein one or more of the frame members have a vertically-depending portion.

9. The security apparatus as claimed in claim 4, wherein the first and second end members each have a vertically-depending portion which can prevent longitudinal movement or deter removal of the CPU in the absence of the cover plates.

10. The security apparatus as claimed in claim 5, wherein said connecting rod is threaded at said proximal end and wherein the respective cover plate includes correspondingly mating threaded means, whereby said threaded end can be threaded through said threaded means to a predetermined depth.

11. The security apparatus of claim 6, wherein said second fasteners are four carriage bolts and associated fastening nuts therefor, said fastening nuts being inaccessible within the base when the cover plates are lockingly connected on the base.

12. The security apparatus as claimed in claim 11, wherein each connecting member further comprises a tubular shield surrounding the portion of the carriage bolt extending between the frame and the base.

13. The security apparatus as claimed in claim 7, wherein the frame comprises a pair of longitudinally-disposed side members spaced-apart by first and second end members, and wherein said connecting members are also used to connect the frame members together.

14. The security apparatus as claimed in claim 7, wherein the dimension of the frame corresponding to the depth of the CPU is adjustable.

15. The security apparatus as claimed in claim 12, wherein the tubular shield comprises a plurality of tubular sections.

16. The security apparatus as claimed in claim 14, wherein the second end member of the frame is U-shaped with legs extending generally parallel to and along a portion of the side frame members, each said leg having a slot through which the carriage bolt is insertable, said slots permitting the U-shaped second end member to contract or expand the longitudinal length of the frame.

17. The security apparatus as claimed in claim 15, wherein the tubular sections are nestable.

18. A security apparatus for a CPU comprising:

a generally elongate, rectangular base having first and second open ends and a support surface against which a CPU can be supported, said base being fastenable to a substantially immovable surface by a plurality of first fasteners whose unfastening elements therefor are contained within the base, said support surface of said base having at least one opening for providing access to said first fastener unfastening elements, said at least one opening being coverable by said CPU when said CPU is positioned against said support surface;

containment means for holding the CPU against said support surface and for restraining movement of the CPU in a first direction generally perpendicularly away from said support surface and in a second direction generally transversely with respect to the end-to-end relationship of the base, said containment means including a plurality of second fasteners whose unfastening elements therefor are contained within the base but accessible through the first and second open ends of the base;

first and second cover plates adapted to cover said first and second open ends, respectively, of said base;

locking means for lockingly connecting said first and second cover plates in a spaced-apart relation; and stop means associated with said first and second cover plates for abutting opposed ends of the CPU for preventing removal of the CPU from said containment means in a third direction generally longitudinally with respect to the end-to-end relation of the base.

19. The security apparatus as claimed in claim 18, wherein the stop means comprises a tab projecting from each cover plate beyond the support surface of the base.

20. The security apparatus as claimed in claim 18, wherein said containment means further comprises:

a generally rectangular frame which overlaps at least two opposed edges of the surface of the CPU which is opposite the surface to be supported against the base, said frame being connectable generally at or near its corners to said base by two pairs of said second fasteners wherein the fasteners of each pair are spaced-apart less than the predetermined minimum expected depth of the CPU and the pairs of fasteners are spaced-apart so as to accommodate the CPU therebetween.

21. The security apparatus as claimed in claim 19, wherein the locking means is adjustable to vary the distance between the tabs of the cover plates and wherein the base has a slot in its upper surface extending inwardly from one of the open ends of the base through which the tab of a respective one of the cover plates can slide to accommodate variations of the CPU depth.

22. The security apparatus as claimed in claim 20, wherein the frame comprises a first end frame member, a second end frame member and a pair of side frame members connected together at or near their ends by said second fasteners.

23. The security apparatus of claim 20, wherein said second fasteners are four carriage bolts and associated fastening nuts therefor, said fastening nuts being inaccessible within the base when the cover plates are lockingly connected on the base.

24. The security apparatus as claimed in claim 20, wherein the portion of each said second fastener extending between said frame and said base is covered by a tubular shield.

25. The security apparatus as claimed in claim 21, wherein the locking means comprises a connecting rod having distal and proximal ends, said proximal end being attachable to one of said cover plates, a lock chamber affixed to the other of said cover plates, and a lock cylinder attachable to the distal end of said connecting rod, said lock cylinder being adapted to be lockingly received in said lock chamber.

26. The security apparatus as claimed in claim 22 wherein at least the first and second end frame members include a vertical extension which is positioned to abut the respective front and rear surfaces of the CPU to further prevent movement of said CPU in said third direction and/or to prevent removal of the CPU in said third direction in the absence of said cover plates.

27. The security apparatus as claimed in claim 22 wherein each said side frame members includes a vertical extension which is positionable interiorly of the pairs of second fasteners.

28. The security apparatus as claimed in claim 25, wherein the effective length of said connecting rod is variable.

29. The security apparatus as claimed in claim 26, wherein the dimension of the frame corresponding to the depth of the CPU is adjustable.

30. The security apparatus as claimed in claim 29, wherein the second end member of the frame is U-shaped with legs extending generally parallel to and along a portion of the side frame members, each said leg having a slot through which the second fastener is insertable, said slots permitting the U-shaped second end member to contract or expand the longitudinal length of the frame.

31. The security apparatus as claimed in claim 27, wherein the distance between the vertical extensions of the side frame members is adjustable.

32. The security apparatus as claimed in claim 24, wherein the tubular shield comprises a plurality of tubular sections.

33. The security apparatus as claimed in claim 32, wherein the tubular sections are nestable.

34. A security apparatus for a CPU comprising:

a generally rectangular base having first and second ends of which at least one is open and a support surface against which a CPU can be supported, said base being fastenable to a substantially immovable surface by a plurality of first fasteners whose unfastening elements therefor are contained within the base, said support surface of said base having at least one opening for providing access to said first fastener unfastening elements, containment means for holding the CPU against said support surface and for restraining movement of the CPU in a first direction generally perpendicularly away from said support surface and in a second direction generally transversely with respect to the end-to-end relationship of the base, said containment means including a plurality of second fasteners whose unfastening elements therefor are contained within the base but accessible through said at least one open end or said at least one opening, said at least one opening in said support surface being coverable by said CPU when said CPU is positioned against said support surface;

cover means for covering each open end of said base, said cover means being movable with respect to the base from a closed position closing said open end to an open position away from said open end, stop means provided at or near both said first and second ends for preventing removal of the CPU from said containment means in a third direction generally parallel with respect to said end-to-end relationship of the base, said stop means associated with each open end being generally fixed with respect to said cover means for movement therewith into and out of a blocking position adjacent a portion of the CPU, said portion of the CPU being opposite another portion of said CPU against which the other of said stop means substantially abuts; and locking means for locking said cover means in said closed position.

35. The security apparatus as claimed in claim 34, wherein said cover means and stop means associated therewith are made integrally in the form of a door.

36. The security apparatus as claimed in claim 34 wherein said base comprises two open ends.

37. The security apparatus as claimed in claim 34, wherein said containment means further comprises:

a generally rectangular frame which overlaps at least two opposed edges of the surface of the CPU which is opposite the surface to be supported against the base, said frame being connectable generally at or near its corners to said base by two pairs of said second fasteners wherein the fasteners of each pair are spaced-apart less than the predetermined minimum expected depth of the CPU and the pairs of fasteners are spaced-apart so as to accommodate the CPU therebetween.

38. The security apparatus as claimed in claim 34, wherein said stop means not associated with an open end comprises a tab extending above said support surface of said base.

39. The security apparatus as claimed in claim 35 wherein said cover means is hingedly attached for pivotal movement.

40. The security apparatus as claimed in claim 36 wherein said locking means locks the cover means of one open end to the cover means of the other open end.

41. The security apparatus as claimed in claim 37, wherein the frame comprises a unitary, planar sheet.

* * * * *